US012647325B2

(12) United States Patent
Ju et al.

(10) Patent No.: US 12,647,325 B2
(45) Date of Patent: Jun. 2, 2026

(54) CONTAINER NETWORK CONTROLLER

(71) Applicant: ZTE Corporation, Shenzhen (CN)

(72) Inventors: Manchang Ju, Shenzhen (CN); Baoguo Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/644,430

(22) Filed: Apr. 24, 2024

(65) Prior Publication Data

US 2024/0314042 A1     Sep. 19, 2024

Related U.S. Application Data

(63) Continuation of application No. PCT/CN2022/075746, filed on Feb. 10, 2022.

(51) Int. Cl.
| | |
|---|---|
| *H04L 41/122* | (2022.01) |
| *H04L 41/0895* | (2022.01) |
| *H04L 41/14* | (2022.01) |
| *H04L 41/40* | (2022.01) |
| *H04L 41/5051* | (2022.01) |

(52) U.S. Cl.
CPC ........ *H04L 41/122* (2022.05); *H04L 41/0895* (2022.05); *H04L 41/14* (2013.01); *H04L 41/40* (2022.05); *H04L 41/5051* (2013.01)

(58) Field of Classification Search
CPC ... H04L 41/122; H04L 41/14; H04L 41/0895; H04L 41/34; H04L 41/40; H04L 41/5051; G06F 2009/45595; G06F 9/45558
See application file for complete search history.

(56) References Cited

U.S. PATENT DOCUMENTS

| | | | |
|---|---|---|---|
| 10,911,374 B1 | 2/2021 | Kumar et al. | |
| 2022/0075666 A1* | 3/2022 | Xia | G06F 9/5077 |
| 2022/0283792 A1* | 9/2022 | Kumar | H04L 41/0895 |
| 2023/0136061 A1* | 5/2023 | Hung | H04L 41/0806 |
| | | | 709/222 |
| 2023/0342183 A1* | 10/2023 | Xia | H04L 41/0895 |
| 2024/0134701 A1* | 4/2024 | Xia | G06F 9/45558 |

(Continued)

FOREIGN PATENT DOCUMENTS

| | | |
|---|---|---|
| CN | 111698112 A | 9/2020 |
| CN | 111949364 A | 11/2020 |

OTHER PUBLICATIONS

European Telecommunications Standards Institute (ETSI), "Network Functions Virtualisation (NFV) Release 4; Management and Orchestration; Requirements for service interfaces and object model for OS container management and orchestration specification," dated May 2021, 20 pages.

(Continued)

*Primary Examiner* — Tonia L Dollinger
*Assistant Examiner* — Joseph M Cousins
(74) *Attorney, Agent, or Firm* — Crowell & Moring LLP

(57) ABSTRACT

A container network controller (CNC) in a Network Functions Virtualization (NFV) system may be used to manage and control services for complex container networks to establish an autonomous network for container networks. These management or control services include an intention analysis service, a container network life-cycle management function, operations and maintenance (O&M) data processing service, and/or a policy creation function.

7 Claims, 9 Drawing Sheets

(56) References Cited

U.S. PATENT DOCUMENTS

2024/0179079 A1 * 5/2024 Mullally ............ H04L 41/5051

OTHER PUBLICATIONS

European Telecommunications Standards Institute (ETSI), "Network Functions Virtualisation (NFV) Release 4; Management and Orchestration; Report on enabling autonomous management in NFV-MANO," dated Aug. 2021, 54 pages.
Extended European Search Report in European application No. 22925312.5, dated Oct. 14, 2024, 9 pages.
International Search Report issued in related Chinese Patent Application No. PCT/CN2022/075746 (4 pages).
Written Opinion issued in related Chinese Patent Application No. PCT/CN2022/075746 (4 pages).
Wang Haining et al.; NFVO standards and practice, Telecommunications Science, Apr. 2017.

* cited by examiner

Figure 4

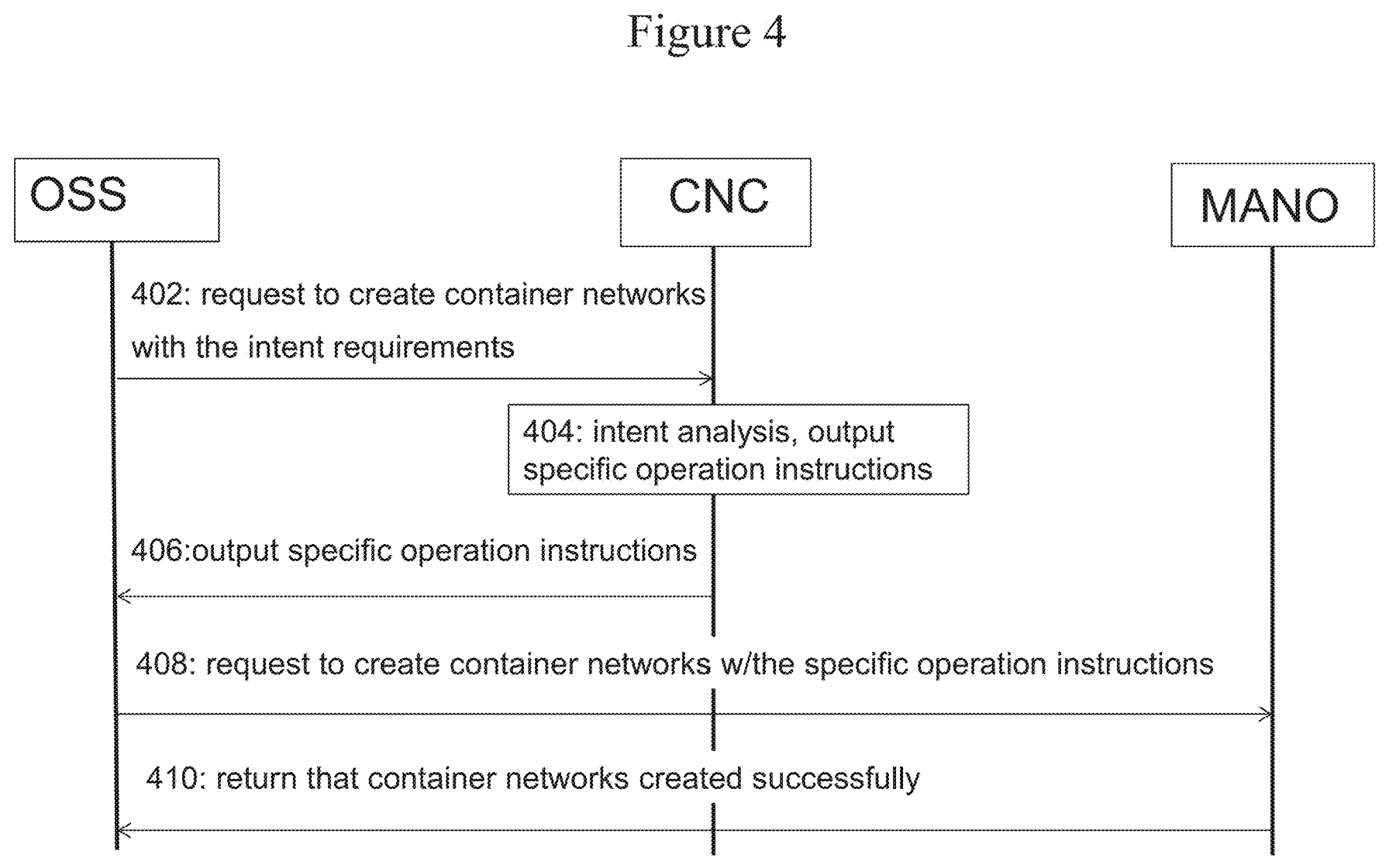

OSS     CNC     MANO

402: request to create container networks with the intent requirements

404: intent analysis, output specific operation instructions

406: output specific operation instructions

408: request to create container networks w/the specific operation instructions

410: return that container networks created successfully

Figure 5

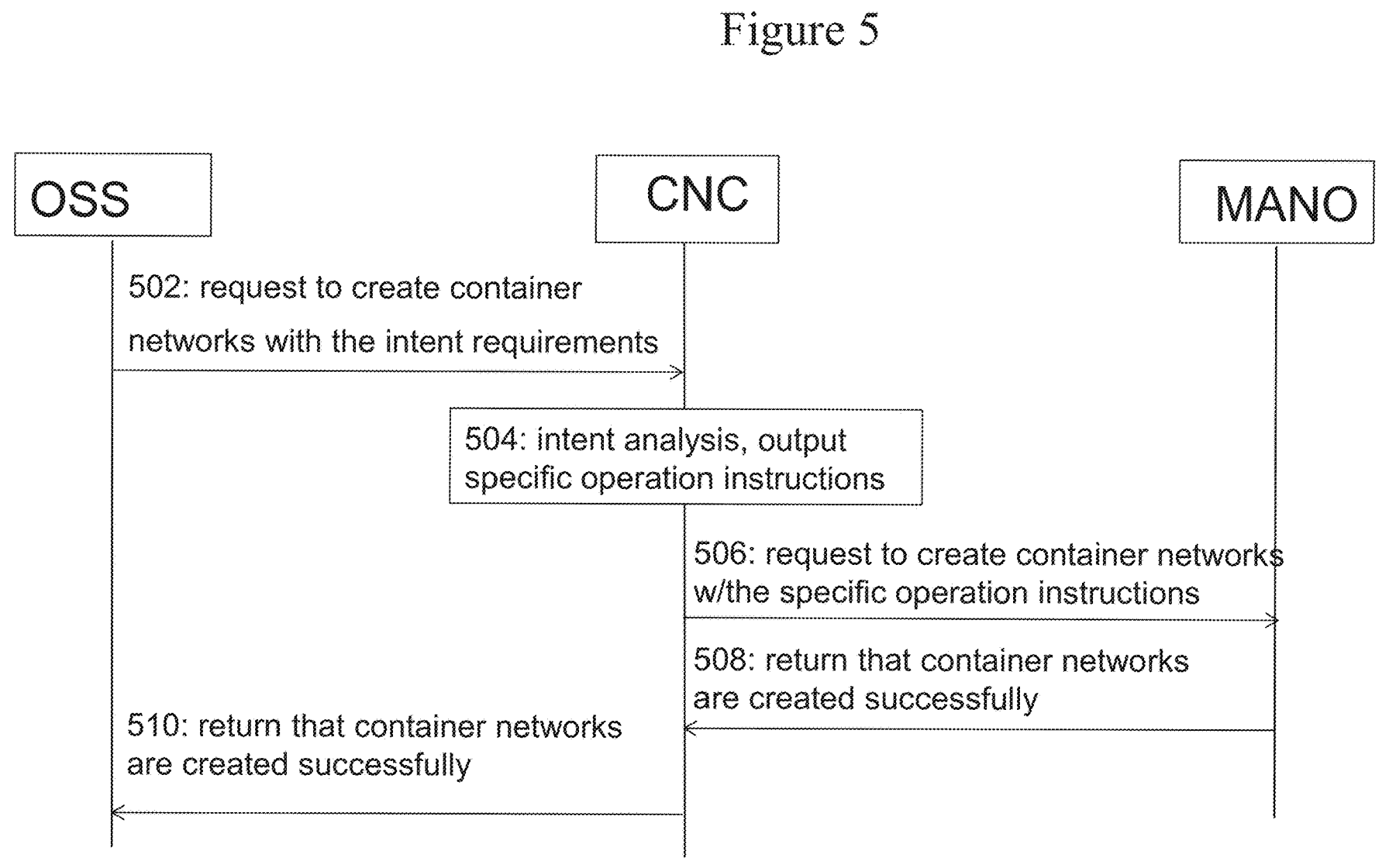

MANO

CNC

OSS

502: request to create container networks with the intent requirements

504: intent analysis, output specific operation instructions

506: request to create container networks w/the specific operation instructions

508: return that container networks are created successfully

510: return that container networks are created successfully

Figure 6

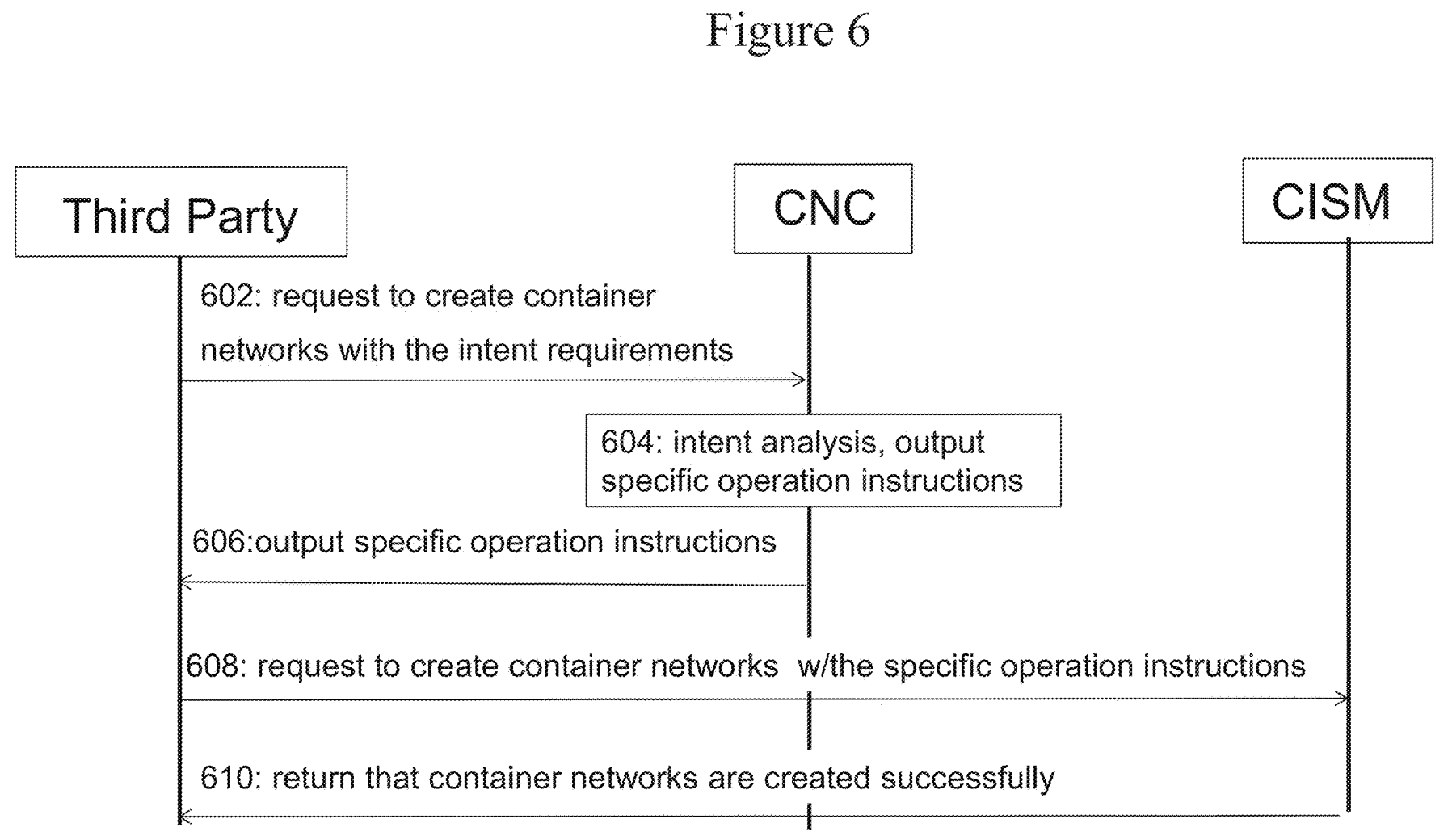

CISM

CNC

Third Party

602: request to create container networks with the intent requirements

604: intent analysis, output specific operation instructions

606:output specific operation instructions

608: request to create container networks  w/the specific operation instructions 610: return that container networks are created successfully

Figure 9

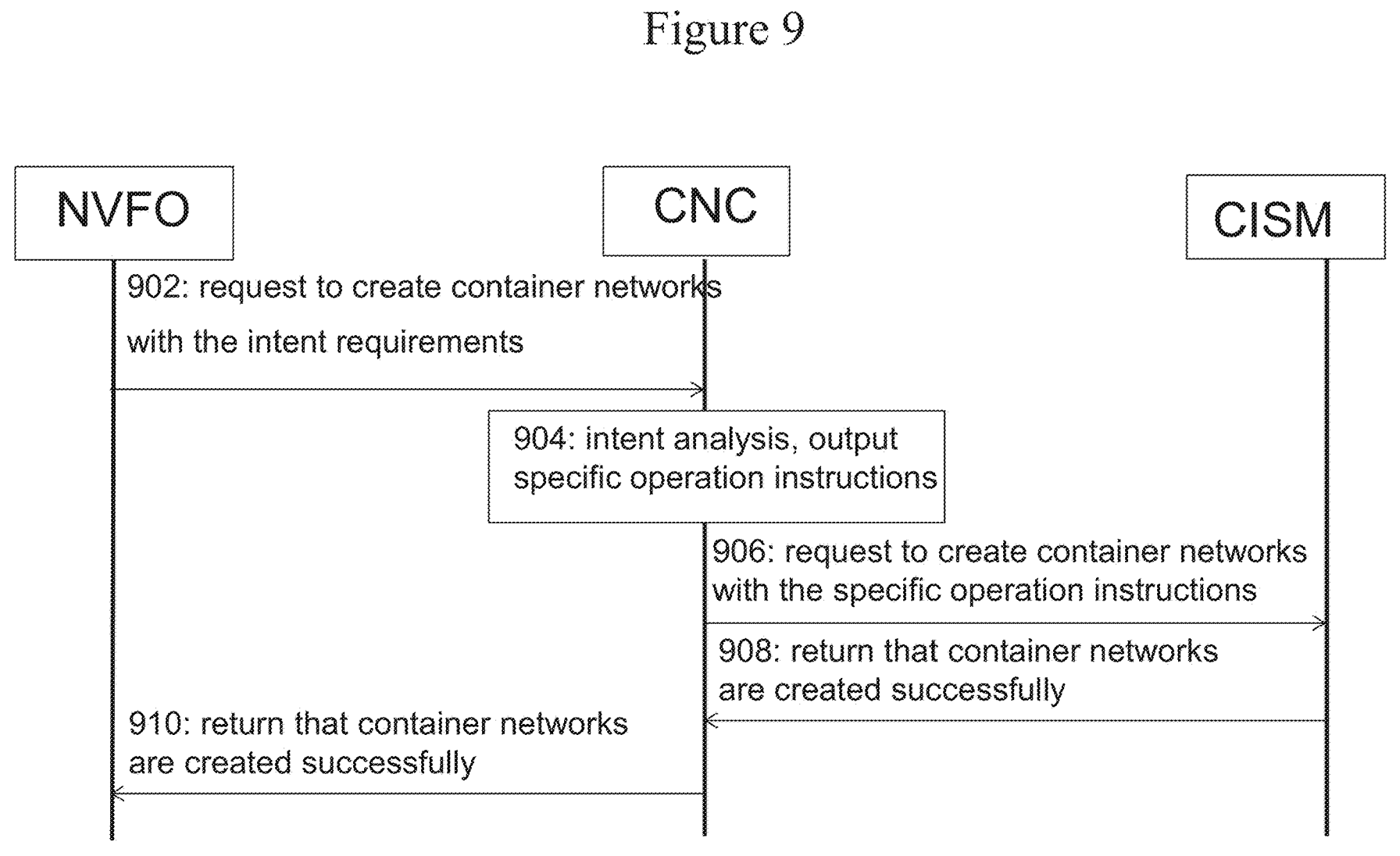

NVFO

CNC

CISM

902: request to create container networks with the intent requirements

904: intent analysis, output specific operation instructions

906: request to create container networks with the specific operation instructions 908: return that container networks are created successfully 910: return that container networks are created successfully

CONTAINER NETWORK CONTROLLER

This application is a continuation application of PCT International Application No. PCT/CN2022/075746, filed with the China National Intellectual Property Administration, PRC on Feb. 10, 2022, wherein the content of each of the above-referenced applications is incorporated herein by reference in its entirety.

TECHNICAL FIELD

This document is directed generally to communications technology. More specifically, communications technology includes a controller for a container network with a virtual network function.

BACKGROUND

Communication technologies are moving the world toward an increasingly connected and networked society. With the development of telecom network functions and services, there are more and more types of network elements deployed in the network. The increase in the types and quantities of network elements has also brought many problems, such as the variety of hardware platforms, complex maintenance; hardware that cannot be shared, resources are wasted; new services require new hardware platform support, and increased time to market. In one example, cloud computing technology can reduce construction, operation, and maintenance costs. The technology can realize a decoupling of software and hardware and dynamically adjust resources according to service load to meet the business processing capabilities of network functions. Virtualization technology enables flexible allocation of resources and distribution to improve service deployment efficiency.

Network Functions Virtualization (NFV) is a software processing technology that uses general hardware and virtualization technology to carry other functions, and is mainly used to reduce the cost of network equipment. Through software and hardware decoupling and functional abstraction, NFV can make network equipment functions no longer depend on dedicated hardware, so that resources can be fully and flexibly shared. A goal of NFV technology is to replace specialized hardware devices provided by traditional telecom equipment manufacturers by providing network functions on high-capacity servers, high-capacity storage, and high-capacity switching equipment based on industry standards. The resulting benefit is that standard-based network technology equipment may be more inexpensive, while an open API (Application Programming Interface) interface can also help operations. Opening up more telecommunications basic network capabilities can improve resource usage and deployment of networks to ensure service quality and improve resource utilization. For example, telecom operators can adopt technologies such as virtualization and cloud computing to realize the virtualization of network functions. It may also be desirable to speed up the deployment of the business, such as the Virtualized Network Function Descriptor (VNFD) to describe the composition of the virtual network function, such as the virtual deployment unit (Virtualization Deployment Unit), information about VDUs, virtual links, link requirements between VNFs (Virtual Network Features), automatic scaling policies, monitoring parameters, network function deployment specifications, and VNF lifetime events. A VNF deployment specification describes the deployment requirements of a specific VNF, such as supporting different requirements of users in terms of VNF capacity and performance. Different VNF deployment specifications are different in terms of network connection, number of instantiated virtual machines, and automation deployment strategy.

For NFV technology, a Network Functions Virtualization Management and Orchestration (NFV-MANO) may be responsible for the lifecycle management of Network Service (NS) and VNF. Improvements for container network management are needed.

SUMMARY

This document relates to methods, systems, and devices for a container network controller (CNC) in a Network Functions Virtualization (NFV) system. In the NFV system, the CNC may be used to manage and control services for complex container networks to establish an autonomous network for container networks. These management or control services include an intention analysis service, a container network life-cycle management (LCM) function, operations and maintenance (O&M) data processing service, and/or a policy creation function.

In one embodiment, a system includes a Network Functions Virtualization (NFV) environment that includes a container network controller (CNC) for container network management and control within the NFV environment. The CNC provides intent management for container networks such as the NFV environment by parsing intent requirements into specific container network operation management information. The CNC provides a container network life-cycle management function for container networks such as the NFV environment. The container network life-cycle management function implements container network operation management based on an output of the intent management parsing the intent requirements. The CNC provides operations and maintenance (O&M) data processing service for container networks such as the NFV environment. The system further includes a Network Functions Virtualization Management and Orchestration (NFV-MANO) coupled with the CNC through a service interface. The NFV-MANO comprises a container network life-cycle management (LCM) service. The NFV-MANO comprises a container infrastructure service management (CISM) configured to interact with a container infrastructure service instance (CISI) to create container infrastructure objects of the container based virtualized network function (VNF). The system further includes an Operation Support Systems (OSS) coupled with the CNC through a service interface that is configured for initiating functions for the CNC. The OSS manages or creates container networks such as the NFV environment. The system further includes a third party coupled with the CNC through a service interface that is configured for initiating functions for the CNC. The third party manages or creates container networks such as the NFV environment.

In one embodiment, a method for container network management includes receiving intent instructions through a service interface from another entity for a container network; performing an intent analysis based on the intent instructions; and initiating creation of a container network based on the intent analysis. The another entity comprises at least one of a Network Functions Virtualization Management and Orchestration (NFV-MANO), an Operation Support Systems (OSS), or a third party. The receiving and performing are by a container network controller (CNC) which provides management service for the another entity to control the container network. The method further includes updating one or more container networks based on the intent analysis. The intent analysis further includes parsing container network operation management information to generate operation instructions.

In one embodiment, a method for network control includes utilizing an intent requirement for container network management; invoking an intent analysis service based on the intent requirement to generate a container network operation; and initiating container network management based on the container network operation. The utilizing, invoking and initiating is by an Operation Support Systems (OSS) and the intent analysis service is from a container network controller (CNC), and the container network management is initiating from the OSS to a Network Functions Virtualization Management and Orchestration (NFV-MANO). The utilizing further comprises generating, by the OSS the intent requirement. The utilizing further comprises receiving the intent requirement from a third party at the OSS. The container network operation comprises a policy or a container network operation command.

In one embodiment, a method for network management includes initiating a monitoring data service for analyzing container network performance data; reporting data from the monitoring data service; and updating a container network based on the reported data. The method further includes communicating that the container network is updated. The initiating, reporting and updating are by a Network Functions Virtualization Management and Orchestration (NFV-MANO). The monitoring data service is part of a container network controller (CNC) and the initiating comprises the NFV-MANO communicating with the CNC. The reporting is from the NFV-MANO to the CNC. The method further includes analyzing, by the CNC, the container network performance data; generating a policy for the updating based on the analyzing; and sending the policy from the CNC to the NFV-MANO for the NFV-MANO to perform the updating. The method further includes generating, by the NFV-MANO, an intent requirement about container network management; initiating an intent analysis service with the CNC for container network operation information; and initiating container network management by the CNC based on the intent analysis. The method further includes receiving, by the NFV-MANO from a third party, an intent requirement about container network management; initiating an intent analysis service with the CNC for container network operation information; and initiating container network management by the CNC based on the intent analysis.

In one embodiment, a communications or network apparatus comprises a processor and a memory, and the processor is configured to read code from the memory and implement any of the embodiments discussed above.

In one embodiment, a computer program product comprises a computer-readable program medium code stored thereupon, the code, when executed by a processor, causes the processor to implement any of the embodiments discussed above.

In some embodiments, there is a network apparatus comprising a processor and a memory, wherein the processor is configured to read code from the memory and implement any methods recited in any of the embodiments. In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

BRIEF DESCRIPTION OF THE DRAWINGS

FIG. 4 illustrates an embodiment with an Operation Support Systems (OSS) operates as an intent initiator.

FIG. 5 illustrates another embodiment with an Operation Support Systems (OSS) operates as an intent initiator.

FIG. 6 illustrates an embodiment with a third party operating as an intent initiator.

FIG. 9 illustrates another embodiment with a Network Functions Virtualization Orchestrator (NFVO) operating as an intent initiator.

DETAILED DESCRIPTION

Figure 1:
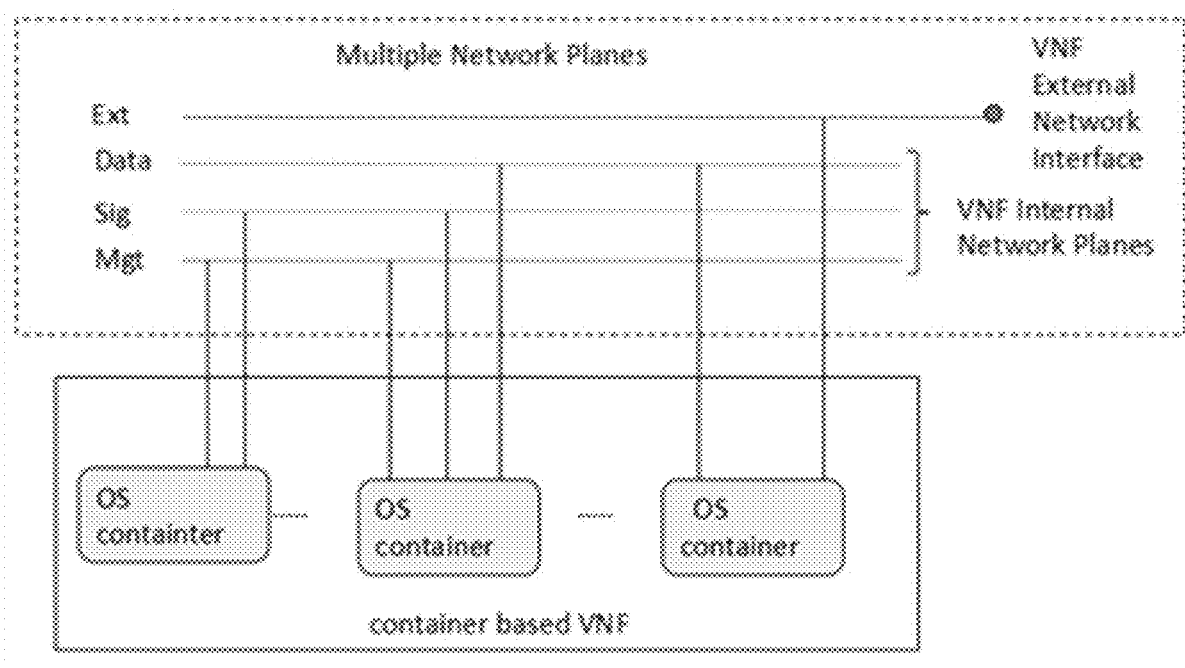
FIG. 1 illustrates network connectivity for operating system (OS) containers attaching multiple network planes.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

A container network controller (CNC) in a Network Functions Virtualization (NFV) system may be used to manage and control services for complex container networks to establish an autonomous network for container networks. These management or control services include an intention analysis service, a container network life-cycle management function, operations and maintenance (O&M) data processing service, and/or a policy creation function. The embodiments provide a method, apparatus, and/or system for container network controller in an NFV system. In the NFV system, the container network controller (CNC) is used to manage complex container networks to achieve a goal of autonomous network for container networks.

FIG. 1 illustrates network connectivity for operating system (OS) containers attaching multiple network planes. As described below, there may be a container network controller (CNC) that provides management and control services for the container network. Three OS containers are shown as part of a container based Virtualized Network Function (VNF). VNF includes virtualized network capabilities for computing, storage, and/or network resource deployment. There may be more or fewer OS containers. The OS containers can attach to multiple networks (or network planes) of the VNF according to network descriptions in the VNFD. Specifically, the multiple networks can be associated to multiple types of network planes within a VNF. Example planes are shown in FIG. 1 and include VNF internal network planes, such as management (Mgt), signaling (Sig) and data. There may also be VNF external networks (Ext). The VNF external networks may be used to connect the VNF with other container based VNFs, virtual machine (VM)-based VNFs and physical network functions (PNFs) via a VNF external network interface. The VNF internal networks may be used to connect OS containers within the same VNF.

Figure 2:
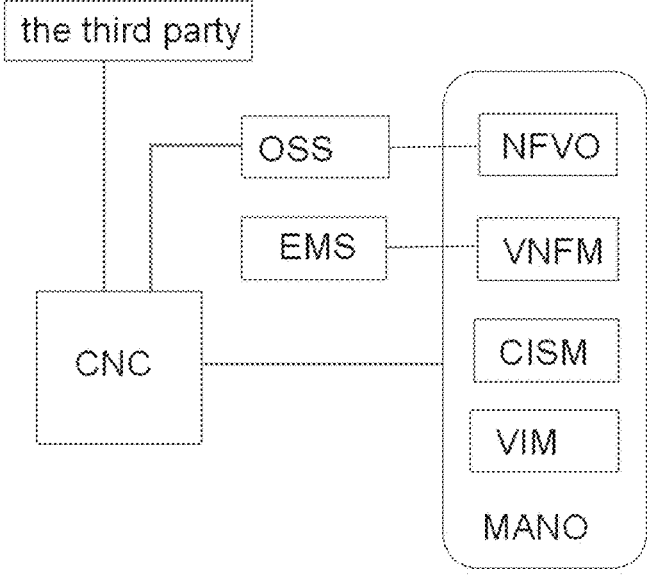
FIG. 2 illustrates a Network Functions Virtualization (NFV) architecture for supporting container networks with a container network controller (CNC).

FIG. 2 illustrates a Network Functions Virtualization (NFV) architecture for supporting container networks with a container network controller (CNC). The connections and components shown in FIG. 2 are one example embodiment of the connections for the CNC. The CNC provides service functions and interfaces (described with reference to FIG. 3) that can be invoked by other entities, such as the third party, the Operation Support Systems (OSS) or the Network Functions Virtualization Management and Orchestration (NFV-MANO).

A third party can communicate with the CNC. Examples of the third party are further described below with respect to FIGS. 6-7. An operation and service management system (OSS) may provide carrier operation and service support functions, including registration of network services and virtual network functions, as well as management of services such as performance. As described with respect to FIG. 3 and FIGS. 6-7, the OSS may generate an intent requirement about container network management or receives an intent requirement from a third party entity to invoke an intent analysis service in the CNC to generate the specific container network operation information, which may be a policy or a specific container network operation command. The OSS can then initiate container network management to NFV-MANO with the specific container network operation information.

Network element management (EMS) may include abnormal processing, policy management, as well as being responsible for application-related configuration, error, billing, performance, and security management of virtual network functions.

Figure 3:
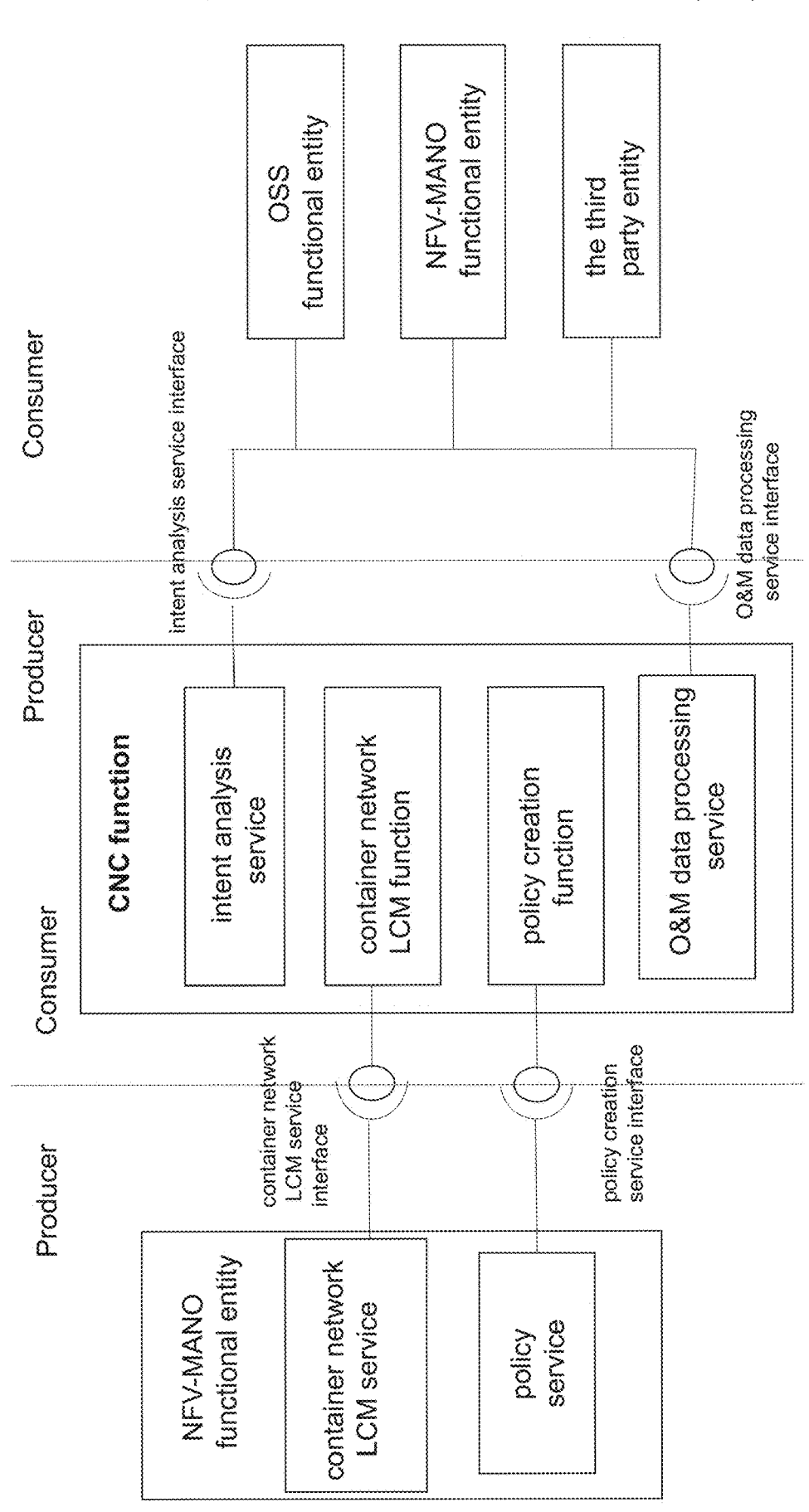
FIG. 3 illustrates functions of a container network controller (CNC).

The Network Functions Virtualization Management and Orchestration (NFV-MANO) or just MANO can invoke container management functions, such as those described with respect to FIG. 3. The MANO includes Network Function Virtualization Orchestrator (NFVO), Virtualized Network Function Manager (VNFM), Container Infrastructure Service Management (CISM), and/or Virtualized Infrastructure Manager (VIM). NFVO may provide for the registration of network services and virtual network functions, resource scheduling, life cycle management, and/or management of network service instances. VNFM may manage or control virtual network functions (VNF) initiation and lifetime management (e.g. manage a life cycle of VNFs), as well as application-independent configuration. The Container Infrastructure Service Management (CISM) may include the management of managed container infrastructure objects (e.g. Kubernetes® Pods) with dynamic service resource allocation, or may include the management of the virtualized resources exposed by the container runtime environment (i.e., the Container Infrastructure Service (CIS)). Virtual Infrastructure Manager (VIM) may provide for carrier infrastructure and/or be used to control and manage virtualized resources including the calculation, storage, and management of network resources, and storage and management.

In some embodiments, the CISM may communicate with a Container Infrastructure Service Instance (CISI) which may be a container infrastructure resources within a Network Functions Virtualization Infrastructure (NFVI) Virtualization Layer (not shown) and provides the container runtime environment. The CISM can interact with the CISI to create all managed container infrastructure objects which are the components of the container based Virtualized Network Function (VNF) and allocate container resources for them. NFVI may be responsible for comprehensively virtualizing hardware resources such as computing, storage, and networking, and mapping them into virtual resources. The VNF may run on NFVI, use virtual resources virtualized by NFVI, and use software to implement various functions. NFV-MANO may be responsible for managing and orchestrating the relationship between VNF and VNFI, the relationship between VNF and VNF, and/or the relationship between VNF and other physical network functions.

FIG. 3 illustrates functions of a container network controller (CNC). While FIG. 2 illustrated an enhanced NFV architecture with container network management functions by a container network controller (CNC), FIG. 3 illustrates functions performed by the CNC. The CNC may be used for the intent analysis about container network requirements and container network life-cycle management. The CNC may also be used for operations and maintenance (O&M) data processing and policy creation. The CNC creates a concrete execution operation information to implement container networks management according to the intent requirement.

The CNC provides management and control services for the container networks. The NFV-MANO, the OSS or the third party entity can use the service provided by CNC to manage these container networks. The management capabilities include but are not limited to intention analysis service, container network life-cycle management function, O&M data processing service, and policy creation function.

The CNC externally provides various service functions and interfaces. Example services include intent analysis, performance management, alarm management, log management, fault management, life cycle management (LCM), policy creation, and/or (O&M) data processing and policy creation. These functions can be invoked by the Operation Support Systems (OSS), NFV-MANO, and/or the third party as shown in FIG. 2. The CNC can also initiate the functions for the OSS and/or the NFV-MANO. There may be service interfaces to cooperate with OSS and NFV-MANO to implement the container network management function.

The intent analysis service receives intent requirements from the OSS, the third party entity or NFV-MANO, and it can parse them into specific container network operation management information. The container network life-cycle management function in the CNC can request the NFV-MANO to implement specific container network operation management based on the output of the intent analysis service. The O&M data processing service receives the monitoring data from NFV-MANO, analyzes and processes the data. The O&M data processing service can also request the policy creation function in the CNC to create policy for updating container networks. In some embodiments, if the performance is degraded, the CNC can notify the OSS of the alarm. The policy creation function may receive the requirements from the O&M data processing service, create the policy for updating container networks, and send a request to the NFV-MANO to update the container networks with the created policy.

The CNC may interact with the OSS through a service interface. If the OSS needs to manage container networks or create container networks, the OSS can invoke this interface to send the intent requirements to the CNC. The CNC analyzes these intent requirements and outputs specific operation instructions for OSS to manage container networks.

The CNC may interact with a third party through a service interface. If the third party needs to manage container networks or create container networks, then the third party can invoke this interface to send the intent requirement to the CNC. The CNC analyzes these intent requirements and implements specific operation instructions to the CISM or the NFVO to create or update container networks.

The CNC interacts with the NFV-MANO through a service interface. If the NFVO needs to manage container networks or update container networks, the NFVO may also send the intent requirement to the CNC. The CNC analyzes these intent requirements, and the CNC outputs specific operation instructions for NFVO to manage container networks.

FIG. 4 illustrates an embodiment with an Operation Support Systems (OSS) operates as an intent initiator. The OSS generates intent requirements about container network management, or receives intent requirements from the third party entity, and requests the CNC to perform container network management with these intent requirements. In this example embodiment, the OSS initiates the container network creation/update. Specifically, the OSS initiates the creation container networks as the intent initiator. In block 402, the OSS requests the CNC to create container networks with intent requirement. In block 404, the CNC performs the intent analysis based on the request. In block 406, the CNC outputs specific operation instructions to the OSS based on the intent analysis. In block 408, the OSS requests the MANO to create container networks with specific operation instructions. In block 410, the MANO (or NFV-MANO) returns that container networks created successfully.

FIG. 5 illustrates another embodiment with an Operation Support Systems (OSS) operates as an intent initiator. FIG. 5 is an alternative embodiment to the embodiment shown in FIG. 4 in which the OSS is the intent initiator. The OSS initiates the creation of container networks as the intent initiator, but CNC communicates with the MANO rather than the OSS. In block 502, the OSS requests the CNC create container networks with an intent requirement. In block 504, the CNC performs an intent analysis based to the intent requirements and outputs specific operation instructions. In block 506, the CNC requests the MANO to create container networks with the specific operation instructions generated in block 504. In block 508, the MANO communicates to the CNC that container networks are created successfully. In block 510, the CNC communicates to the OSS that container networks are created successfully.

Figure 7:
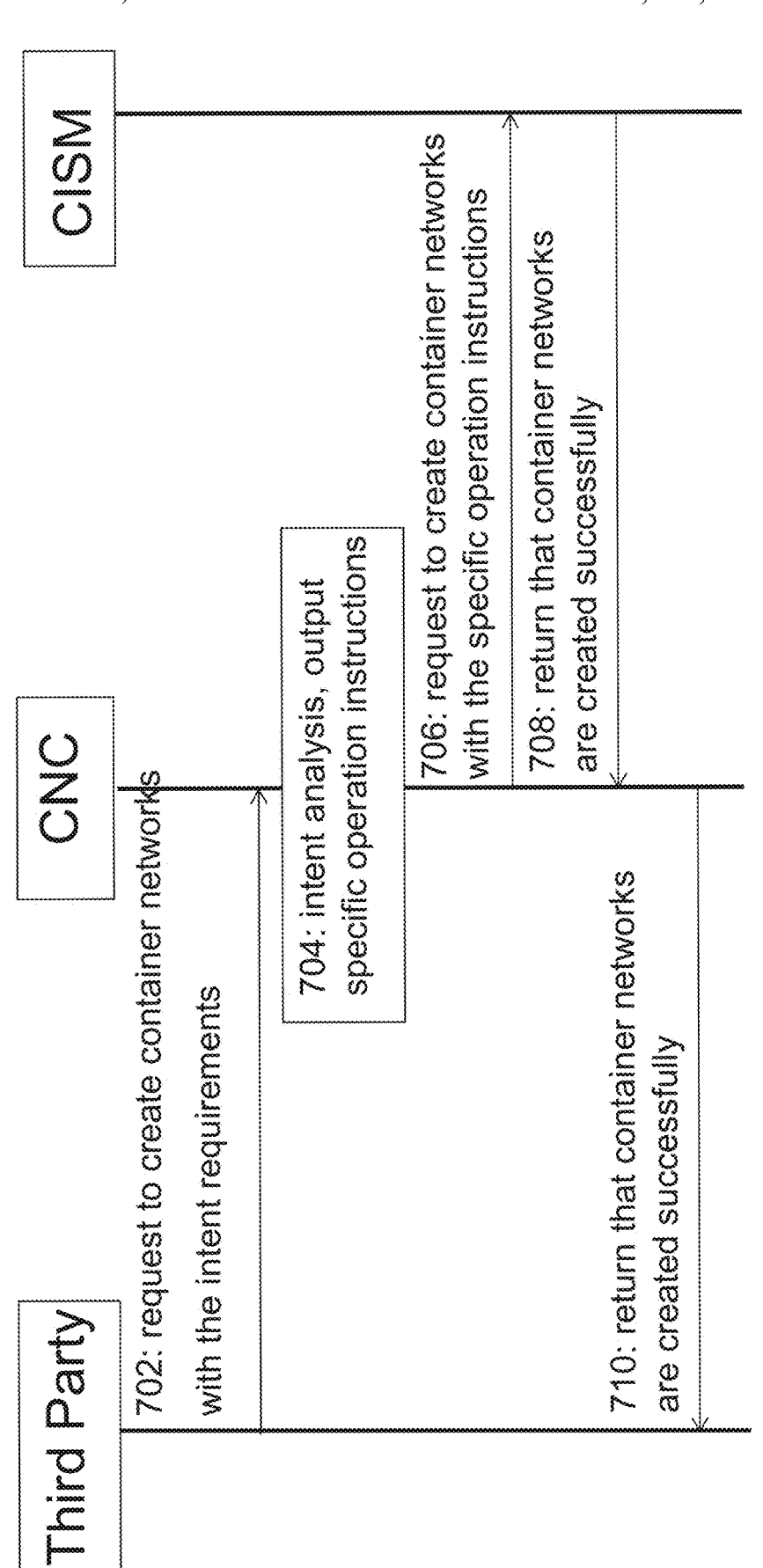
FIG. 7 illustrates another embodiment with a third party operating as an intent initiator.

FIG. 6 illustrates an embodiment with a third party operating as an intent initiator. FIGS. 4-5 illustrated the OSS as the intent initiator and FIGS. 6-7 illustrate the third party as the intent initiator. In some embodiments, it may be necessary to establish a dedicated network for the dedicated VNF. For example, a network service may need to add a dedicated VNF to process an Internet of Things (IoT) scenario, and then container networks need to be created to process the dedicated VNF network connection. The third party may be an IoT provider in one example.

In this embodiment, the third party (such as an IoT provider) initiates the container network creation or update. In block 602, the third party entity sends a request to the CNC to create container networks with certain intent requirements. In block 604, the CNC performs and intent analysis and outputs specific operation instructions. In block 606, the CNC provides the specific operation instructions to the third party entity based on the intent analysis. In block 608, the third party entity communicates a request to the CISM to create container networks based on the specific operation instructions provided. In block 610, the CISM communicates with the third party that the container networks are created successfully.

FIG. 7 illustrates another embodiment with a third party operating as an intent initiator. FIG. 7 is an alternative embodiment to the embodiment shown in FIG. 6 in which the third party is the intent initiator. The third party initiates the creation of container networks as the intent initiator, but the CNC communicates with the CISM rather than the third party. In block 702, the third party entity (e.g. a service provider or an IoT provider) sends a request to the CNC to create container networks with the intent requirements. In block 704, the CNC performs an intent analysis for the intent requirements to generate specific operation instructions. In block 706, the CNC communicates a request to the CISM to create container networks based on the specific operation instructions. In block 708, the CISM communicates with the CNC that container networks are created successfully. In block 710, the CNC communicates to the third party entity that container networks are created successfully.

Figure 8:
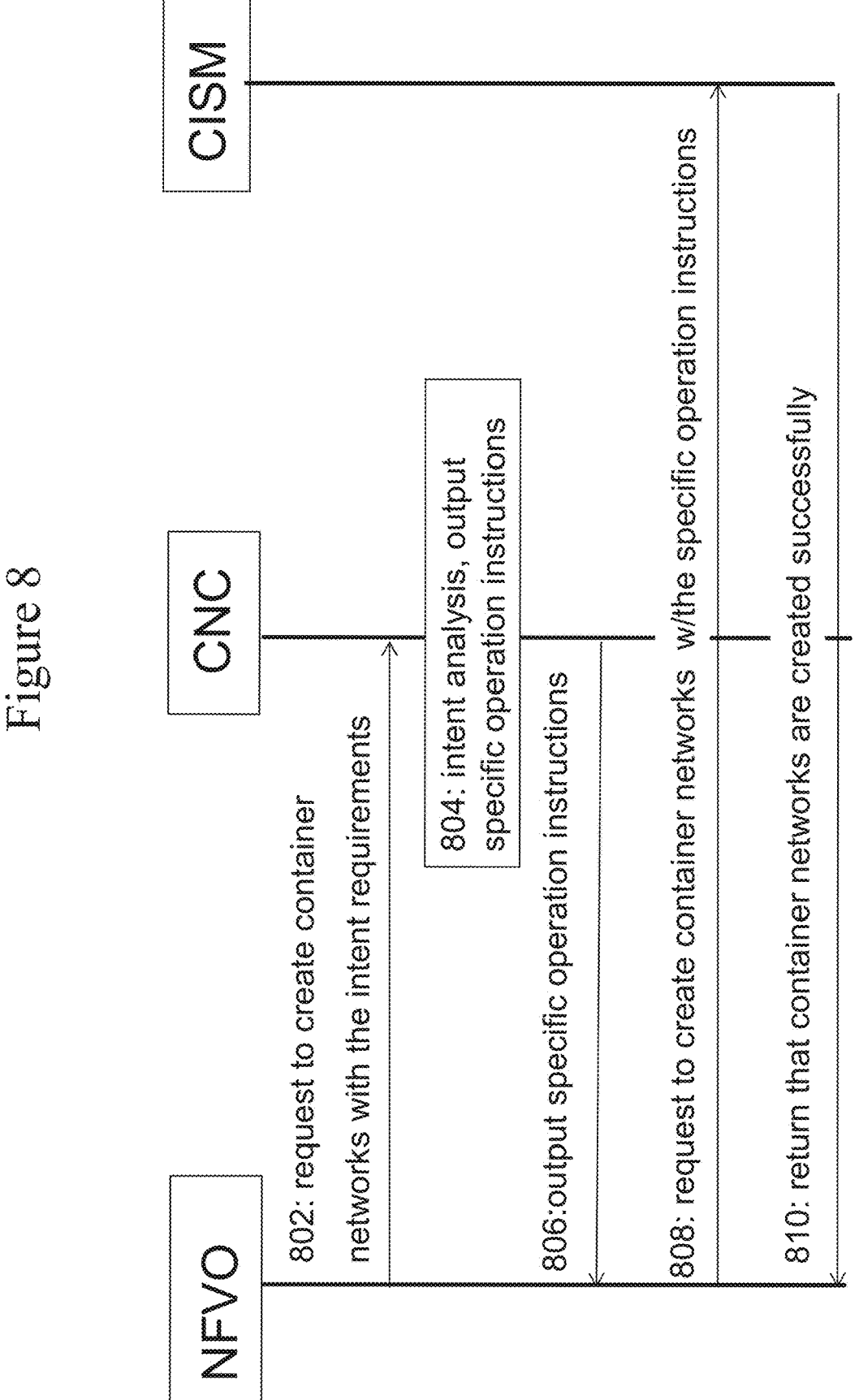
FIG. 8 illustrates an embodiment with a Network Functions Virtualization Orchestrator (NFVO) operating as an intent initiator.

FIG. 8 illustrates an embodiment with a Network Functions Virtualization Orchestrator (NFVO) operating as an intent initiator. FIG. 8 illustrates an embodiment with the NFVO operating as an intent initiator. FIGS. 4-5 illustrated the OSS as the intent initiator, FIGS. 6-7 illustrated the third party as the intent initiator, and FIGS. 8-9 illustrate the NFVO as the intent initiator. In this embodiment, the NFVO initiates the container network creation or update. In block 802, the NFVO sends a request to the CNC to create container networks with certain intent requirements. In block 804, the CNC performs and intent analysis and outputs specific operation instructions. In block 806, the CNC provides the specific operation instructions to the NFVO based on the intent analysis. In block 808, the NFVO communicates a request to the CISM to create container networks based on the specific operation instructions provided. In block 810, the CISM communicates with the NFVO that the container networks are created successfully.

FIG. 9 illustrates another embodiment with a Network Functions Virtualization Orchestrator (NFVO) operating as an intent initiator. FIG. 9 is an alternative embodiment to the embodiment shown in FIG. 8 in which the NFVO is the intent initiator. The NFVO initiates the creation of container networks as the intent initiator, but the CNC communicates with the CISM rather than the NFVO. In block 902, the NFVO sends a request to the CNC to create container networks with the intent requirements. In block 904, the CNC performs an intent analysis for the intent requirements to generate specific operation instructions. In block 906, the CNC communicates a request to the CISM to create container networks based on the specific operation instructions. In block 908, the CISM communicates with the CNC that container networks are created successfully. In block 910, the CNC communicates to the NFVO that container networks are created successfully.

Figure 10:
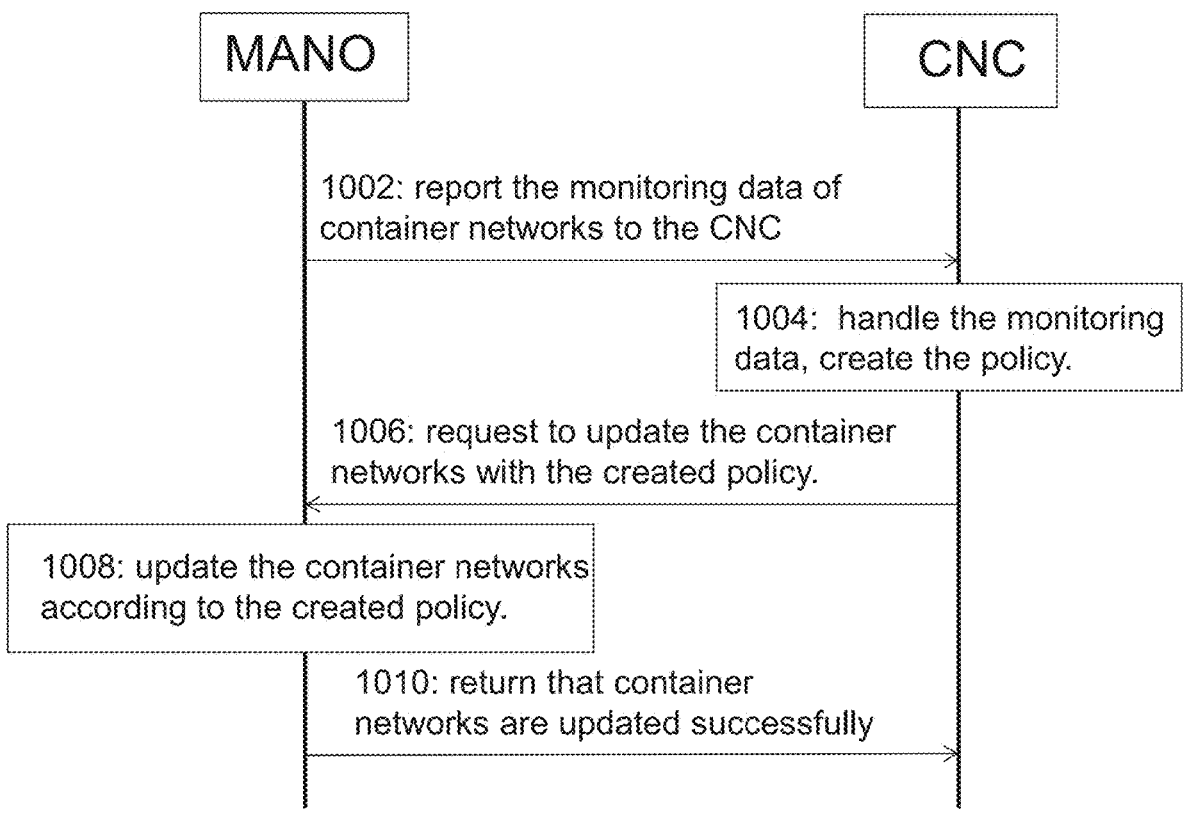
FIG. 10 illustrates an embodiment of updating a container network based on monitoring.

FIG. 10 illustrates an embodiment of updating a container network based on monitoring. The NFV-MANO may initiate or invoke a monitoring data service in the CNC to analyze the container network performance monitoring data. The NFV-MANO performs an updating operation of container networks based on the created policy. The NFVO generates an intent requirement about container network management or receives an intent requirement from a third party entity. The intent requirement is used to initiate the intent analysis service in the CNC to generate specific container network operation information. The specific container network operation information may be a policy or a specific container network operation command.

The NFVO can initiate container network management to the CISM with the specific container network operation information. The NFVO generates intent requirements about container network management, or receives intent requirements from the third party entity, and requests the CNC to perform container network management with these intent requirements.

FIG. 10 illustrates the updating of container networks based on monitoring data. In block 1002, the NFV-MANO reports the monitoring data of container networks to the CNC. In block 1004, the CNC receives and analyzes the monitoring data to create the relevant policy or update the relevant container networks according to the data. In some embodiments, if the performance is degraded but container networks do not need to be updated based on the local configured rule, the CNC may only be able to notify the OSS of the alarm, and no further action is required. In block 1006, the CNC communicates a request to the NFV-MANO to update the relevant container networks with the created policy. In block 1008, the NFV-MANO updates the relevant container networks based on the created policy. In block 1010, the NFV-MANO communicates with the CNC that the container networks are updated successfully.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
 a Network Functions Virtualization (NFV) environment comprises:
 a container network controller (CNC) for container network management and control within the NFV environment;

a Network Functions Virtualization Management and Orchestration (NFV-MANO) coupled with the CNC through a service interface; and
 an Operation Support Systems (OSS) coupled with the CNC through a service interface that is configured for initiating functions for the CNC, wherein:
  the CNC is configured to analyze an intent requirement to obtain an intent analysis result and output the intent analysis result to the OSS, and
  the OSS is configured to initiate an container network management to the NFV-MANO based on the intent analysis result.

2. The system of claim 1 wherein the CNC provides intent management for container networks by parsing intent requirements into specific container network operation management information.

3. The system of claim 2 wherein the CNC provides a container network life-cycle management function for container networks, wherein the container network life-cycle management function implements container network operation management based on an output of the intent management parsing the intent requirements.

4. The system of claim 1 wherein the CNC provides operations and maintenance (O&M) data processing service for container networks.

5. The system of claim 1, wherein the NFV-MANO comprises a container network life-cycle management (LCM) service.

6. The system of claim 1, wherein the OSS manages or creates container networks.

7. The system of claim 1 further comprising:
 a third party coupled with the CNC through a service interface that is configured for initiating functions for the CNC, wherein the third party manages or creates container networks.

* * * * *